US008884547B2

(12) United States Patent
Lin et al.

(10) Patent No.: US 8,884,547 B2
(45) Date of Patent: Nov. 11, 2014

(54) CURRENT REGULATING CIRCUIT OF LIGHT EMITTING DIODE (LED) STRING AND LED ILLUMINATION DEVICE

(75) Inventors: Huang-Ti Lin, Hsin-Chu (TW); Wen-Ti Chang, Hsin-Chu (TW); Chia-Yuan Chang, Hsin-Chu (TW); Chun-Chieh Huang, Hsin-Chu (TW)

(73) Assignee: Au Optronics Corp., Hsinchu (TW)

( * ) Notice: Subject to any disclaimer, the term of this patent is extended or adjusted under 35 U.S.C. 154(b) by 310 days.

(21) Appl. No.: 13/271,291

(22) Filed: Oct. 12, 2011

(65) Prior Publication Data

US 2012/0161648 A1 Jun. 28, 2012

(30) Foreign Application Priority Data

Dec. 24, 2010 (TW) ................................ 99145921 A (51) Int. Cl.
*H05B 37/02* (2006.01)
*H05B 33/08* (2006.01)

(52) U.S. Cl.
CPC ........... *H05B 33/0815* (2013.01); *Y02B 20/346* (2013.01); *H05B 33/0827* (2013.01); *Y02B 20/347* (2013.01); *H05B 33/0848* (2013.01)
USPC ............ 315/291; 315/294; 315/297; 315/302

(58) Field of Classification Search
CPC ........... H05B 33/0815; H05B 33/0827; H05B 33/0803; H05B 33/0848; H05B 33/0851
USPC ............. 315/291, 294, 295, 307, 185 R, 192, 315/193, 169.3, 186, 312, 121–123; 345/76–78, 82, 83, 102
See application file for complete search history.

(56) References Cited

U.S. PATENT DOCUMENTS

| 6,697,402 | B2 | 2/2004 | Crawford | |
| 7,490,951 | B2 * | 2/2009 | Klipstein et al. | 362/157 |
| 7,564,434 | B2 | 7/2009 | Kim | |
| 7,843,150 | B2 * | 11/2010 | Wang et al. | 315/307 |
| 7,990,076 | B2 * | 8/2011 | Van Der Veen et al. | 315/307 |
| 2008/0054815 | A1 | 3/2008 | Kotikalapoodi et al. | |
| 2010/0026208 | A1 | 2/2010 | Shteynberg et al. | |

FOREIGN PATENT DOCUMENTS

TW I236165 7/2005

* cited by examiner

*Primary Examiner* — Douglas W Owens
*Assistant Examiner* — Borna Alaeddini
(74) *Attorney, Agent, or Firm* — WPAT, PC; Justin King (57) ABSTRACT

An exemplary current regulating circuit of LED string includes a capacitor, an inductor, a diode, a switch and a detection circuit. First and second terminals of the capacitor respectively are connected to a low voltage and a preset voltage. A first terminal of the inductor is connected to the low voltage. Positive and negative terminals of the diode are respectively connected to a second terminal of the inductor and a high voltage. First and second terminals of the switch are respectively connected to the second terminal of the inductor and the preset voltage. The detection circuit detects the low voltage to thereby switch ON-OFF states of the switch in demand. Moreover, a LED illumination device using the current regulating circuit also is provided.

6 Claims, 7 Drawing Sheets

CURRENT REGULATING CIRCUIT OF LIGHT EMITTING DIODE (LED) STRING AND LED ILLUMINATION DEVICE

TECHNICAL FIELD

The disclosure relates to light emitting diode (LED) control technologies, and more particularly to a current regulating circuit of LED string(s) and a LED illumination device.

DESCRIPTION OF THE DISCLOSURE

The light emitting diode is a type of P-N diode manufactured by special materials, and when the LED is forward-biased, electrons would be recombined at the p-n junction interface to thereby emit light, which is one type of electroluminescent effects. The LED would emit lights with different wavelengths induced by different metal element additions and different ratios of chemical components in the manufacturing process of LED wafer. Early light emitting diodes only can emit blue, green, yellow and red colors of lights, and are primarily applied to indicator lights and display boards. With the emergence of white LEDs, LEDs are further applied for illumination. It is well known that, the LEDs have the advantages of high-efficiency energy conversion, fast response, longevity, small size, easily to focus and low power consumption.

Figure 1:
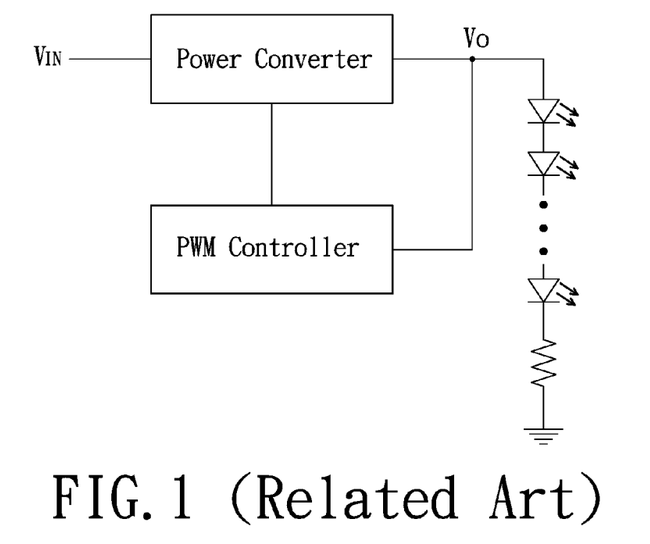
FIG. 1 is a schematic circuit structure of a conventional light emitting diode circuit.

In practical applications, due to LEDs generally have different load characteristics, resulting in different currents under a same cross voltage and thereby appearing different brightnesses, so that multiple LEDs connected in series generally are employed to assure the LEDs in a same LED string would have identical currents and brightnesses. FIG. 1 is a pulse width modulation (PWM) controller generally is provided to acquire an output voltage Vo of a power converter given an input voltage $V_{IN}$ and thereby controls an output current (i.e., a current flowing through the LED string in FIG. 1) of the power converter.

Figure 2:
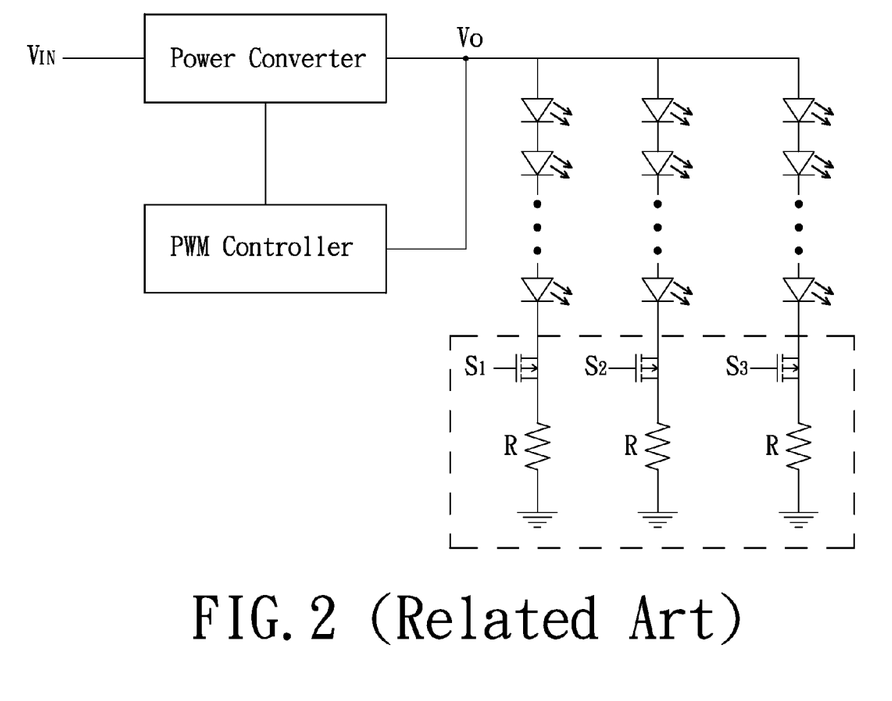
FIG. 2 is a schematic circuit structure of a conventional light emitting diode illumination device.

With the different applications of LED, for example liquid crystal televisions or illumination devices, the required amount of LED is increased, and therefore multiple LED strings are necessarily employed. However, since the LED strings actually have some differences thereamong, currents flowing through the respective LED strings are not completely the same, so that the uniformity of the LED output brightnesses is unsatisfactory. As illustrated in FIG. 2, in order to achieve currents flowing through multiple LED strings being the same, a current adjustment circuit (as denoted by the dashed rectangle in FIG. 2) is additionally used. In particular, conduction states of switches S1, S2 and S3 are controlled to adjust voltages on respective low voltage terminals of the multiple LED strings, so as to make currents flowing through the respective LED strings be the same. However, since the turned on switches S1, S2, S3 are resistive states, resistance differences among the LED strings still are not satisfactorily compensated, so that the LED strings are operated with unbalanced currents, an input current from the power converter is difficult to be evenly distributed to the LED strings and therefore the uniformity of the LED output brightnesses still is unsatisfactory.

SUMMARY OF DISCLOSURE

Accordingly, the disclosure describes a current regulating circuit of light emitting diode string in accordance with an embodiment which is adapted to be electrically coupled with a high voltage and a low voltage of a light emitting diode string. In the exemplary embodiment, the current regulating circuit includes a capacitor, an inductor, a diode, a switch and a detection circuit. The capacitor includes a first terminal and a second terminal, the first terminal of the capacitor is electrically coupled to the low voltage, and the second terminal of the capacitor is electrically coupled to a preset voltage. The inductor includes a first terminal and a second terminal, and the first terminal of the inductor is electrically coupled to the low voltage. The diode includes a positive terminal and a negative terminal, the positive terminal of the diode is electrically coupled to the second terminal of the inductor, and the negative terminal of the diode is electrically coupled to the high voltage. The switch includes a first terminal and a second terminal, the first terminal of the switch is electrically coupled to the second terminal of the inductor, and the second terminal of the switch is electrically coupled to the preset voltage. The detection circuit is for detecting the low voltage to thereby control the switch to be ON-state when the low voltage is higher than a reference voltage and control the switch to be OFF-state when the low voltage is lower than the reference voltage.

In one embodiment, the detection circuit comprises a low pass filter, a comparator and a control unit. The low pass filter is electrically coupled to the low voltage to acquire the value of the low voltage and thereby obtains a stabilizing voltage after the low voltage passing through the low pass filter. The comparator is for comparing the stabilizing voltage with the reference voltage to thereby generate a voltage difference signal. The control unit is for generating a control signal in response to the voltage difference signal to thereby control whether turning on the switch.

A light emitting diode illumination device in accordance with another embodiment comprises a power converter, a pulse width modulation (PWM) controller, multiple light emitting diode strings and multiple current regulating circuits. The power converter receives an input voltage to thereby output a high voltage. The PWM controller acquires the high voltage and thereby controlling the power converter to regulate the high voltage in demand. Each of the light emitting diode strings is electrically coupled between the high voltage and a low voltage. Each of the current regulating circuits is electrically coupled to the low voltage and the high voltage of a corresponding one of the light emitting diode strings.

In one embodiment, each of the current regulating circuits includes a capacitor, an inductor, a diode and a switch. The capacitor includes a first terminal and a second terminal, the first terminal of the capacitor is electrically coupled to the low voltage of the corresponding light emitting diode string, and the second terminal of the capacitor is electrically coupled to a preset voltage. The inductor includes a first terminal and a second terminal, the first terminal of the inductor is electrically coupled to the low voltage of the corresponding light emitting diode string. The diode includes a positive terminal and a negative terminal, the positive terminal of the diode is electrically coupled to the second terminal of the inductor, and the negative terminal of the diode is electrically coupled to the high voltage of the corresponding light emitting diode string. The switch includes a first terminal and a second terminal, the first terminal of the switch is electrically coupled to the second terminal of the inductor, and the second terminal of the switch is electrically coupled to the preset voltage.

In one embodiment, each of the current regulating circuits further comprises a detection circuit. The detection circuit is for detecting the low voltage of the corresponding light emitting diode string to thereby control the switch to be turned on when the low voltage is higher than a reference voltage while control the switch to be turned off when the low voltage is lower than the reference voltage.

In one embodiment, in the light emitting diode illumination device, the detection circuit includes a low pass filter, a comparator and a control unit. The low pass filter is electrically coupled to the low voltage of the corresponding light emitting diode string and thereby outputs a stabilizing voltage after the low voltage passing through the low pass filter. The comparator is for comparing the stabilizing voltage with the reference voltage to thereby generate a voltage difference signal. The control unit is for generating a control signal in response to the voltage difference signal to control whether turning on the switch.

In one embodiment, the reference voltages for the respective light emitting diode strings are different from one another, and the determining of the reference voltages is based on the purpose of achieving same currents flowing through the respective light emitting diode strings.

In the above exemplary embodiments, owing to the novel design of current regulating circuit of light emitting diode string, in which the terminal voltage of LED string is detected and controlled to thereby allow the currents flowing through the respective light emitting diode strings to be prone to the same, so that the phenomenon of unevenly distribution of input current can be effectively improved and therefore the issue of uneven light emitting diode brightness can be solved consequently. In addition, the use of energy storage and release characteristics of capacitor and inductor cooperative with the control of switch facilitates the energy to be recycled in use, the issue of large power consumption caused by the conventional current adjustment circuit generally operated in resistive state can be overcome, so that the currents flowing through the respective light emitting diode strings are uniform/stabilized and the power consumption is reduced.

DETAILED DESCRIPTION OF EMBODIMENTS

The disclosure will now be described more specifically with reference to the following embodiments. It is to be noted that the following descriptions of embodiments are presented herein for purpose of illustration and description only. It is not intended to be exhaustive or to be limited to the precise form disclosed.

Figure 3:
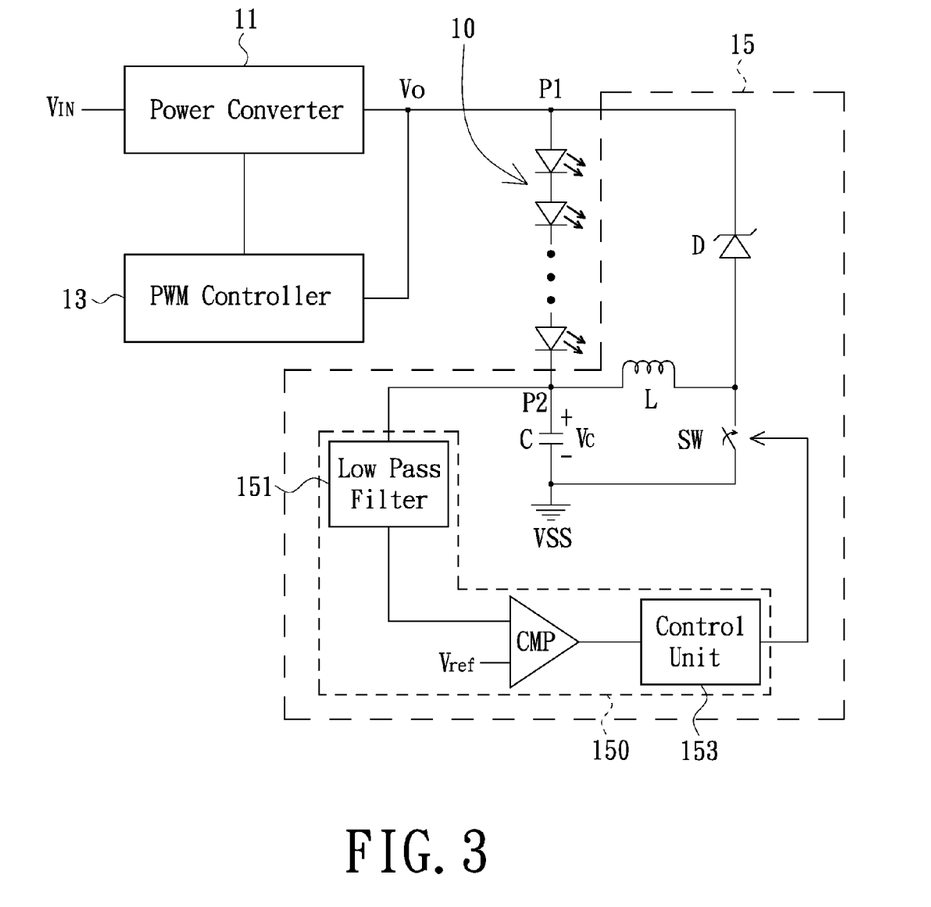
FIG. 3 is a light emitting diode circuit with a current regulating circuit of light emitting diode string in accordance with an embodiment.

Referring to FIG. 3, a schematic circuit structure of a light emitting diode circuit with a current regulating circuit of light emitting diode string in accordance with an embodiment is shown. As depicted in FIG. 3, the light emitting diode string 10 is electrically coupled between a high voltage terminal P1 and a low voltage terminal P2 to receive a high voltage and a low voltage. The power converter 11 receives an input voltage $V_{IN}$ and thereby outputs an output voltage Vo to the high voltage terminal P1 of the light emitting diode string 10 after voltage conversion. The pulse width modulation (PWM) controller 13 is electrically coupled to the high voltage terminal P1 to acquire the output voltage Vo and thereby controls the power converter 11 to regulate the output voltage Vo according to the acquired output voltage Vo.

The current regulating circuit 15 is electrically coupled to the low voltage terminal P2 to thereby detect and control the voltage on the low voltage terminal P2, i.e., the low voltage, so as to control a current flowing through the light emitting diode string 10, achieving the purpose of controlling the light emitting diode output brightness. In the illustrative embodiment, the current regulating circuit 15 includes a capacitor C, an inductor L, a diode D, a switch SW and a detection circuit 150. A terminal of the capacitor C is electrically coupled to the low voltage terminal P2 to receive the low voltage, and another terminal of the capacitor C is electrically coupled to a preset voltage e.g., grounding voltage VSS. A terminal of the inductor L is electrically coupled to the low voltage terminal P2. A positive terminal of the diode D is electrically coupled to another terminal of the inductor L, and a negative terminal of the diode D is electrically coupled to the high voltage terminal P1 to receive the high voltage. A terminal of the switch SW is electrically coupled to the other terminal of the inductor L, and the other terminal of the SW is electrically coupled to the grounding voltage VSS. The detection circuit 150 may include a low pass filter 151, a comparator CMP and a control unit 153, but not to limit the present invention, as long as it can achieve the purpose of controlling ON-OFF states of the switch SW in demand. The low pass filter 151 is electrically coupled to the low voltage terminal P2 to acquire the low voltage on the low voltage terminal P2 (i.e., the capacitor voltage Vc) and thereby outputs a stabilizing voltage after the acquired voltage Vc passing through the low pass filter 151. The comparator CMP compares the stabilizing voltage outputted from the low pass filter 151 with a reference voltage Vref to thereby generate a voltage difference signal. The control unit 153 generates a control signal in response to the voltage difference signal to control the ON-OFF states of the switch SW in demand, i.e., to control a duty on period of the switch SW, so as to render the current flowing through the light emitting diode string 10 to be maintained at a stabilizing state and the light emitting diode output brightnesses to be the same.

Figure 4A:
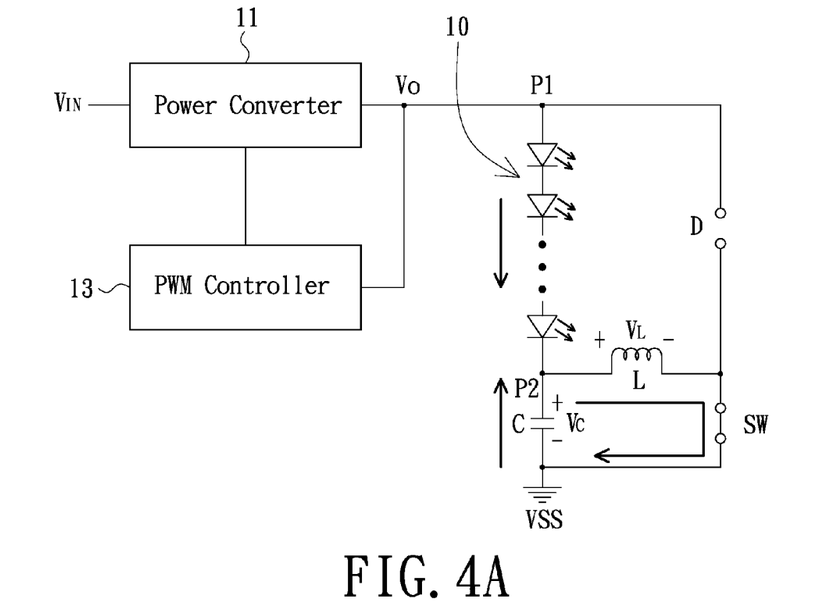
FIGS. 4A and 4B are control process of switching a switch as shown in FIG. 3.

In the following, a control process for switching the switch SW will be described with reference to FIGS. 4A and 4B. As depicted in FIG. 4A, when the capacitor voltage Vc increases, a voltage difference between the high voltage terminal P1 and the low voltage terminal P2 decreases, the current flowing through the light emitting diode string 10 correspondingly decreases, the detection circuit 150 controls the switch SW to be turned on when detects the capacitor voltage Vc is higher than the reference voltage Vref, the current has a short-circuit path to the grounding voltage VS, the diode is turned off, so that the output current from the power converter 11 and the released energy from the capacitor C would be charged into the inductor L for storage until arriving at an inductor voltage $V_L$.

Figure 4B:
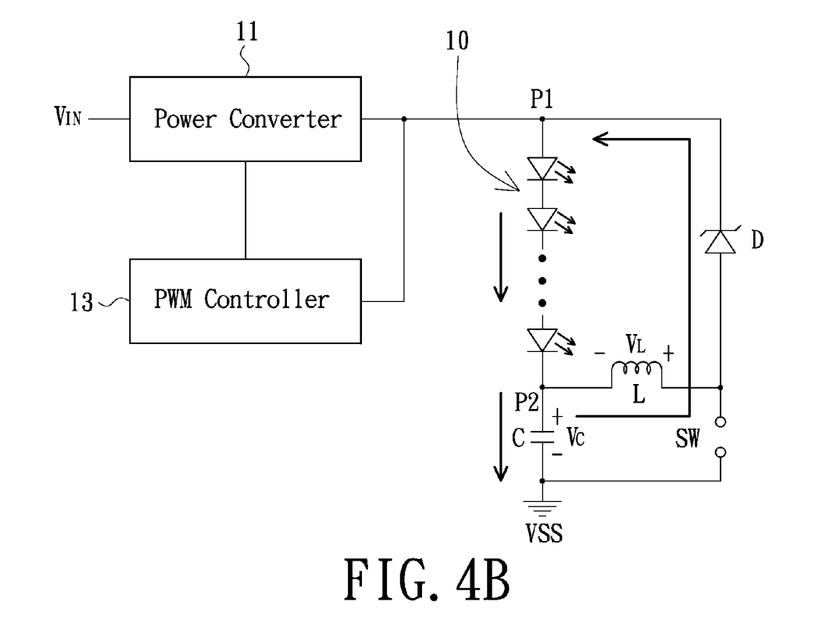

As depicted in FIG. 4B, when the capacitor voltage Vc decreases, the voltage difference between the high voltage terminal P1 and the low voltage terminal P2 increases, the current flowing through the light emitting diode string 10 correspondingly increases, the detection circuit 150 control the switch SW to be turned off when detects the capacitor voltage Vc is lower than the reference voltage Vref, the inductor L starts to release energy, the diode D is turned on, so that the output current from the power converter 11 and the released energy from the inductor L charge into the capacitor C.

In short, the current regulating circuit 15 in accordance with the above exemplary embodiment detects the capacitor voltage Vc to thereby control the switch SW to be ON-state or OFF-state in demand, rendering the current flowing through the light emitting diode string 10 to be maintained at a stabilizing state and the light emitting diode output brightness to be the same. Due to the energy storage and release characteristics of the capacitor C and the inductor L in the loop, the power energy in the control circuit 15 can be recycled in use, so that the power consumption in the whole control circuit 15 can be effectively reduced.

Figure 5A:
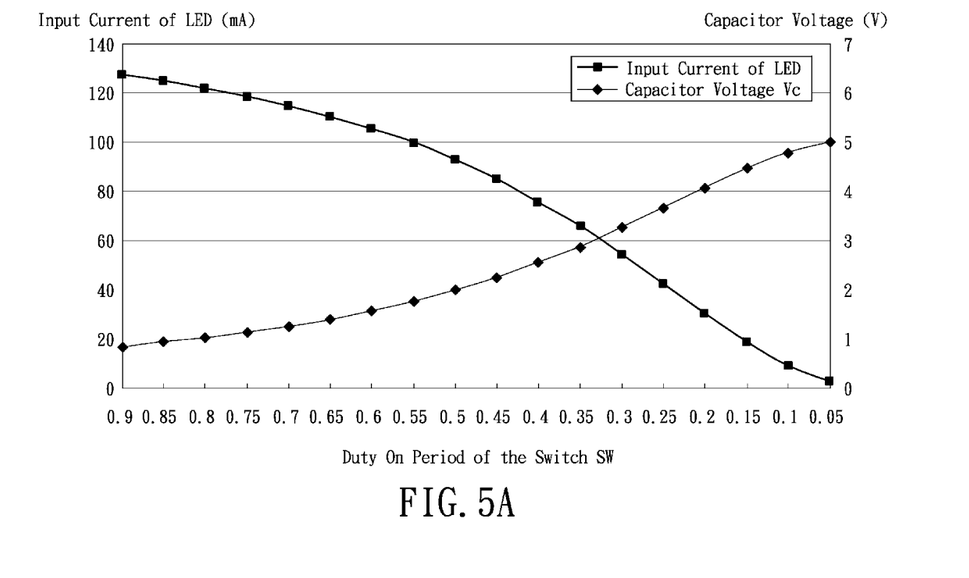
FIGS. 5A, 5B and 5C are experimental results of relationship curves of an input current of light emitting diode string and a capacitor voltage individually with a duty on period of switch under different conditions.

FIG. 5A is an experimental result of associated with relationship curves of an input current of light emitting diode string and the capacitor voltage Vc individually with a duty on period of the switch SW under the following conditions that: the input voltage $V_{IN}$=64.5V, the forward-biased voltage of light emitting diode string Vf=59.4V, the capacitor C=20 μF, the inductor L=13.6 μH, and a switching frequency of the switch SW is 200 KHz. It can be found from FIG. 5A that: the input current of light emitting diode string would be decreased along with the increase of the capacitor voltage Vc, and the capacitor voltage Vc would be increased along with the decrease of the duty on period of the switch SW, so that the input current of light emitting diode string can be adjusted by controlling the duty on period of the switch SW.

Figure 5B:
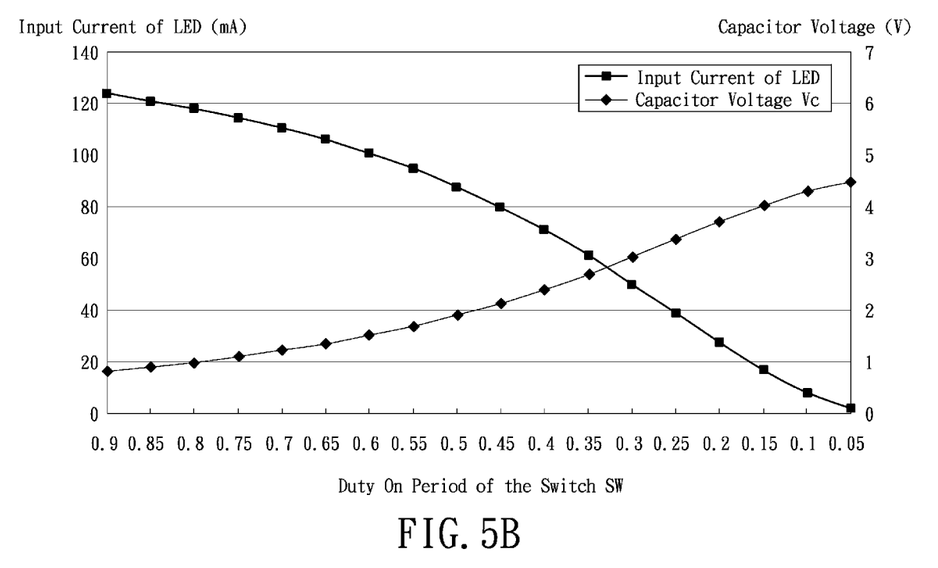

FIG. 5B is another experimental result associated with relationship curves of the input current of light emitting diode string and the capacitor voltage Vc individually with the duty on period of the switch SW under the conditions same as that in FIG. 5A except the forward-biased voltage Vf is changed to be 57V. It also can be found from FIG. 5B that: the input current of light emitting diode string can be adjusted by controlling the duty on period of the switch SW.

Figure 5C:
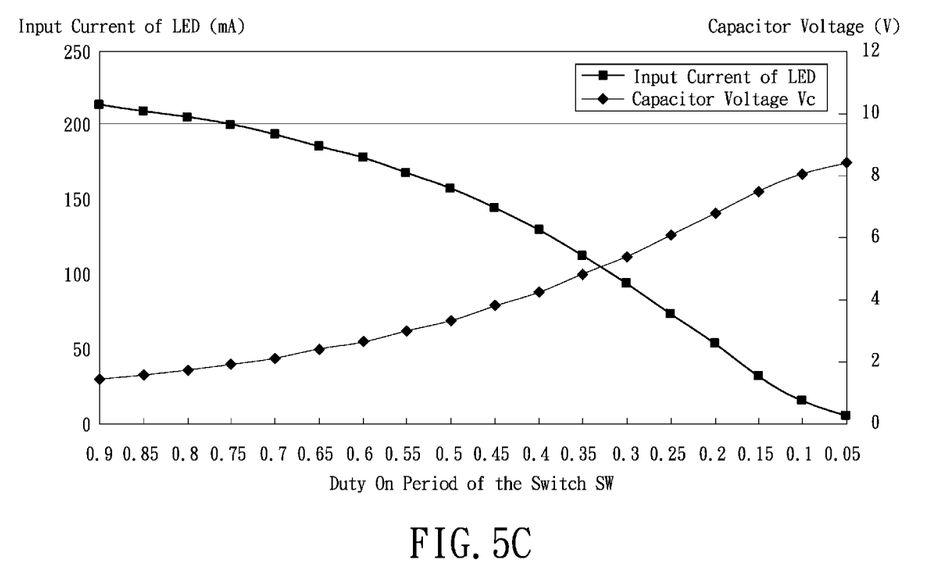

FIG. 5C is still another experimental result associated with relationship curves of the input current of light emitting diode string and the capacitor voltage Vc individually with the duty on period of the switch SW under the conditions same as that in FIG. 5A except the input voltage $V_{IN}$ is changed to be 68V. It also can be found from FIG. 5C that: the input current of light emitting diode string can be adjusted by controlling the duty on period of the switch SW.

It can be concluded from the experimental results of relationship curves as illustrated in FIGS. 5A-5C that: regardless of the change of the input voltage $V_{IN}$ or the forward-biased voltage Vf, the input current of light emitting diode string can be modulated by the current regulating circuit 15 changing the duty on period of the switch SW.

Figure 6:
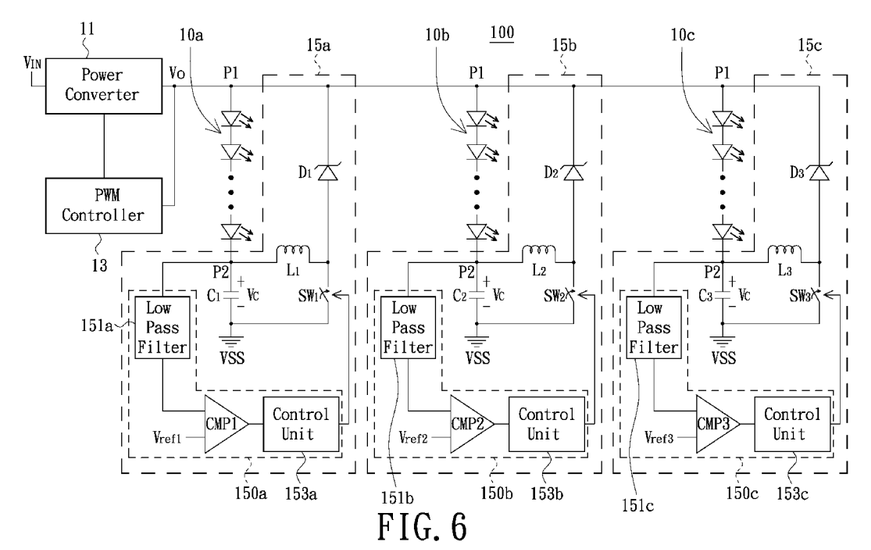
FIG. 6 is a schematic circuit structure of a light emitting diode illumination device in accordance with an embodiment.

Referring to FIG. 6, a schematic circuit structure of a light emitting diode illumination device in accordance with an embodiment is shown. As depicted in FIG. 6, the light emitting diode illumination device 100 includes a power converter 11, a pulse width modulation (PWM) controller 13, multiple light emitting diode strings 10a, 10b, 10c and multiple current regulating circuits 15a, 15b, 15c. The power converter 11 receives an input voltage $V_{IN}$ and thereby outputs an output voltage Vo to high voltage terminals P1 of the respective light emitting diode strings 10a, 10b, 10c after voltage conversion. The PWM controller 13 is electrically coupled to the high voltage terminals P1 to acquire the output voltage Vo and thereby controls the power converter 11 to adjust the output voltage Vo in demand according to the acquired output voltage Vo. The illustrative embodiment associated with FIG. 6 only shows three light emitting diode strings and corresponding three current regulating circuits as an example for the purpose of illustration, but not to limit the present invention, any skilled person in the art can suitably increase or decrease the amounts of the light emitting diode strings and corresponding current regulating circuits to meet the requirements of actual applications.

The high voltage terminals P1 of the respective light emitting diode strings 10a, 10b, 10c receive the output voltage Vo provided from the power converter 11. The current regulating circuits 15a, 15b, 15c are respectively electrically coupled to the low voltage terminals P2 of the light emitting diode strings 10a, 10b, 10c. The current regulating circuit 15a includes a capacitor C1, an inductor L1, a diode D1, a switch SW1 and a detection circuit 150a, and the detection circuit 150a may include a low pass filter 151a, a comparator CMP1 and a control unit 153a. Similarly, the current regulating circuit 15b includes a capacitor C2, an inductor L2, a diode D2, a switch SW2 and a detection circuit 150b, and the detection circuit 150b may include a low pass filter 151b, a comparator CMP2 and a control unit 153b. The current regulating circuit 15c includes a capacitor C3, an inductor L3, a diode D3, a switch SW3 and a detection circuit 150c, and the detection circuit 150c may include a low pass filter 151c, a comparator CMP3 and a control unit 153c. In the illustrative embodiment associated with FIG. 6, the electrical connection relationships of circuit components in each of the current regulating circuits 15a, 15b, 15c are the same as that in the current regulating circuit 15 associated with FIG. 3, and thus will not be repeated herein.

It is noted that, in actual applications, since load characteristics of the respective light emitting diode strings 10a, 10b, 10c generally are different from one another, in order to render the currents flowing through the respective light emitting diode strings 10a, 10b, 10c to be the same, under the circumstance of the high voltage terminals P1 of the respective light emitting diode strings 10a, 10b, 10c being electrically coupled to a same voltage Vo and communicated with one another, the reference voltages Vref1, Vref2, Vref3 used by the respective comparators CMP1, CMP2, CMP3 generally are set to be different from one another. Of course, the high voltage terminals of the respective light emitting diode strings 10a, 10b, 10c may be electrically coupled to receive different input voltages, and/or be electrically independent from one another.

In addition, an operation process of the light emitting diode illumination device 100 as illustrated in FIG. 6 can be summarized as that: when currents flowing through the respective light emitting diode strings 10a, 10b, 10c are different, the detection circuits 150a, 150c, 150c respectively detect voltages on the capacitors C1, C2, C3, compares the voltages on the capacitors C1, C2, C3 with the respective reference voltages Vref1, Vref2, Vref3, and thereby switch the ON-OFF states of the respective switches SW1, SW2, SW3 in demand. Furthermore, the energy storage and release characteristics of the capacitors C1, C2, C3 and the inductors L1, L2, L3 are effectively taken in use, so that the currents flowing through the respective light emitting diode strings 10a, 10b, 10c can achieve the accurate stabilizing effect and the power consumption on each of the current regulating circuits 15a, 15b, 15c also is improved. As a result, the energy on each of the current regulating circuits 15a, 15b, 15c is recycled in use and the output brightnesses of the light emitting diode strings 10a, 10b, 10c are prone to be the same.

Sum up, in the various embodiments, owing to the novel design of current regulating circuit of light emitting diode string, in which the terminal voltage is detected and controlled to thereby allow the currents flowing through the respective light emitting diode strings to be prone to the same, so that the phenomenon of unevenly distribution of input current can be effectively improved and therefore the issue of uneven light emitting diode brightness can be solved consequently. In addition, the use of energy storage and release characteristics of capacitor and inductor cooperative with the control of switch facilitates the energy to be recycled in use, so that the currents flowing through the respective light emitting diode strings are uniform/stabilized and the power consumption is reduced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A current regulating circuit of light emitting diode having a low voltage terminal and a high voltage terminal, the current regulating circuit comprising:
   a capacitor, including a first terminal and a second terminal, wherein the first terminal of the capacitor is electrically coupled to the low voltage terminal of the light emitting diode, and the second terminal of the capacitor is electrically coupled to a preset voltage;
   an inductor, including a first terminal and a second terminal, wherein the first terminal of the inductor is electrically coupled to the low voltage terminal of the light emitting diode;
   a diode, including a positive terminal and a negative terminal, wherein the positive terminal of the diode is electrically coupled to the second terminal of the inductor, and the negative terminal of the diode is electrically coupled to the high voltage terminal of the light emitting diode;
   a switch, including a first terminal and a second terminal, wherein the first terminal of the switch is electrically coupled to the second terminal of the inductor, and the second terminal of the switch is electrically coupled to the preset voltage; and
   a detection circuit, for detecting the voltage value of the low voltage terminal to thereby control the switch to be ON-state when the voltage value of the low voltage terminal is higher than a reference voltage and control the switch to be OFF-state when the voltage value of the low voltage terminal is lower than the reference voltage;
   wherein the voltage value of the low voltage terminal is greater than the preset voltage and smaller than the voltage value of the high voltage terminal.

2. The current regulating circuit as claimed in claim 1, wherein the detection circuit comprises:
   a low pass filter, electrically coupled to the low voltage to acquire the value of the low voltage and thereby obtaining a stabilizing voltage after the low voltage passing through the low pass filter;
   a comparator, for comparing the stabilizing voltage with the reference voltage to thereby generate a voltage difference signal; and
   a control unit, for generating a control signal in response to the voltage difference signal to thereby control whether turning on the switch.

3. A light emitting diode illumination device comprising:
   a power converter, for receiving an input voltage to thereby output a high voltage;
   a pulse width modulation controller, for acquiring the high voltage and thereby controlling the power converter to regulate the high voltage;
   a plurality of light emitting diode strings, wherein each of the light emitting diode strings is electrically coupled between the high voltage and a low voltage; and
   a plurality of current regulating circuits, wherein each of the current regulating circuits is electrically coupled to the low voltage and the high voltage of a corresponding one of the light emitting diode strings,
   wherein each of the current regulating circuits comprises:
      a capacitor including a first terminal and a second terminal wherein the first terminal of the capacitor is electrically coupled to the low voltage of the corresponding light emitting diode string, and the second terminal of the capacitor is electrically coupled to a preset voltage;
      an inductor, including a first terminal and a second terminal, wherein the first terminal of the inductor is electrically coupled to the low voltage of the corresponding light emitting diode string;
      a diode, including a positive terminal and a negative terminal, wherein the positive terminal of the diode is electrically coupled to the second terminal of the inductor, and the negative terminal of the diode is electrically coupled to the high voltage of the corresponding light emitting diode string; and
      a switch, including a first terminal and a second terminal, wherein the first terminal of the switch is electrically coupled to the second terminal of the inductor, and the second terminal of the switch is electrically coupled to the preset voltage.

4. The light emitting diode illumination device as claimed in claim 3, wherein each of current regulating circuits further comprises:
   a detection circuit, for detecting the low voltage of the corresponding light emitting diode string to thereby control the switch to be turned on when the low voltage is higher than a reference voltage and control the switch to be turned off when the low voltage is lower than the reference voltage.

5. The light emitting diode illumination device as claimed in claim 4, wherein the detection circuit comprises:
   a low pass filter, electrically coupled to the low voltage of the corresponding light emitting diode string and thereby outputting a stabilizing voltage after the low voltage passing through the low pass filter;
   a comparator, for comparing the stabilizing voltage with the reference voltage to thereby generate a voltage difference signal; and
   a control unit, for generating a control signal in response to the voltage difference signal to control whether turning on the switch.

6. The light emitting diode illumination device as claimed in claim 4, wherein the reference voltages for the respective light emitting diode strings are different from one another, and the determining of the reference voltages is based on the purpose of achieving same currents flowing through the respective light emitting diode strings.

* * * * *